(12) United States Patent
Lindner et al.

(10) Patent No.: US 6,481,357 B1
(45) Date of Patent: *Nov. 19, 2002

(54) GAS GENERATOR FOR A SAFETY SYSTEM

(75) Inventors: Markus Lindner, Birkenfeld (DE); Marc Winterhalder, Garching an der Alz (DE)

(73) Assignee: TRW Airbag Systems GmbH & Co. KG, Aschau/Inn (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/449,392

(22) Filed: Nov. 26, 1999

(30) Foreign Application Priority Data

Nov. 26, 1998 (DE) ..................... 298 21 232 U

(51) Int. Cl.⁷ ................................. C06D 5/00
(52) U.S. Cl. ..................... 102/530; 280/736; 280/737; 280/741; 280/742
(58) Field of Search ................ 280/741, 742, 280/736, 737; 102/530, 531, 440

(56) References Cited

U.S. PATENT DOCUMENTS

| | | | | |
|---|---|---|---|---|
| 3,642,304 A | * | 2/1972 | Johnson et al. ............. 280/737 |
| 3,731,843 A | * | 5/1973 | Anderson, Jr. .............. 280/736 |
| 3,810,655 A | * | 5/1974 | Pracher ...................... 280/741 |
| 3,813,007 A | | 5/1974 | Doin et al. | |
| 5,601,310 A | * | 2/1997 | Di Giacomo et al. ....... 280/741 |
| 5,639,117 A | | 6/1997 | Mandzy et al. ............. 280/741 |
| 5,669,631 A | | 9/1997 | Johnson et al. ............ 280/741 |
| 5,713,596 A | * | 2/1998 | Messina et al. ............ 280/741 |
| 5,779,266 A | * | 7/1998 | Moore et al. ............... 280/741 |
| 5,851,030 A | * | 12/1998 | Johnson et al. ............ 280/741 |
| 5,857,699 A | * | 1/1999 | Rink et al. .................. 280/737 |
| 5,947,514 A | * | 9/1999 | Keller et al. ................ 280/742 |
| 6,036,226 A | * | 3/2000 | Brown et al. ............... 280/736 |
| 6,039,347 A | * | 3/2000 | Maynard .................... 280/736 |
| 6,076,468 A | * | 6/2000 | Di Giacomo et al. ....... 280/737 |

FOREIGN PATENT DOCUMENTS

| | | |
|---|---|---|
| DE | 2129901 | 12/1971 |
| DE | 29813961 U1 | 12/1971 |
| DE | 19726276 | * 12/1998 |
| GB | 2294999 A | 5/1996 |
| WO | WO9833684 | 8/1998 |

* cited by examiner

Primary Examiner—Harold J. Tudor
(74) Attorney, Agent, or Firm—Tarolli, Sundheim, Covell, Tummino & Szabo L.L.P.

(57) ABSTRACT

The invention relates to a gas generator for a safety system, in particular for a vehicle occupant restraint system, comprising a combustion chamber which contains propellant, a liquid chamber which contains liquid, and a mixing chamber in which a gas developed on burning of the propellant and the liquid mix with each other. The gas generator further comprises a liquid guide surface onto which the liquid when released is applied substantially tangentially, and a gas directing channel and a surface delimiting the gas directing channel. A flow break-off edge is provided in the mixing chamber, which flow break-off edge is defined on one side by the liquid guide surface and on the other side by the surface delimiting the gas directing channel. The gas directing channel directs a stream of developed gas into the mixing chamber at an angle of between approximately 60° and 120° with respect to the liquid guide surface in a region of the flow break-off edge, so that the liquid loosing from the flow break-off edge is entrained by the gas stream.

18 Claims, 2 Drawing Sheets

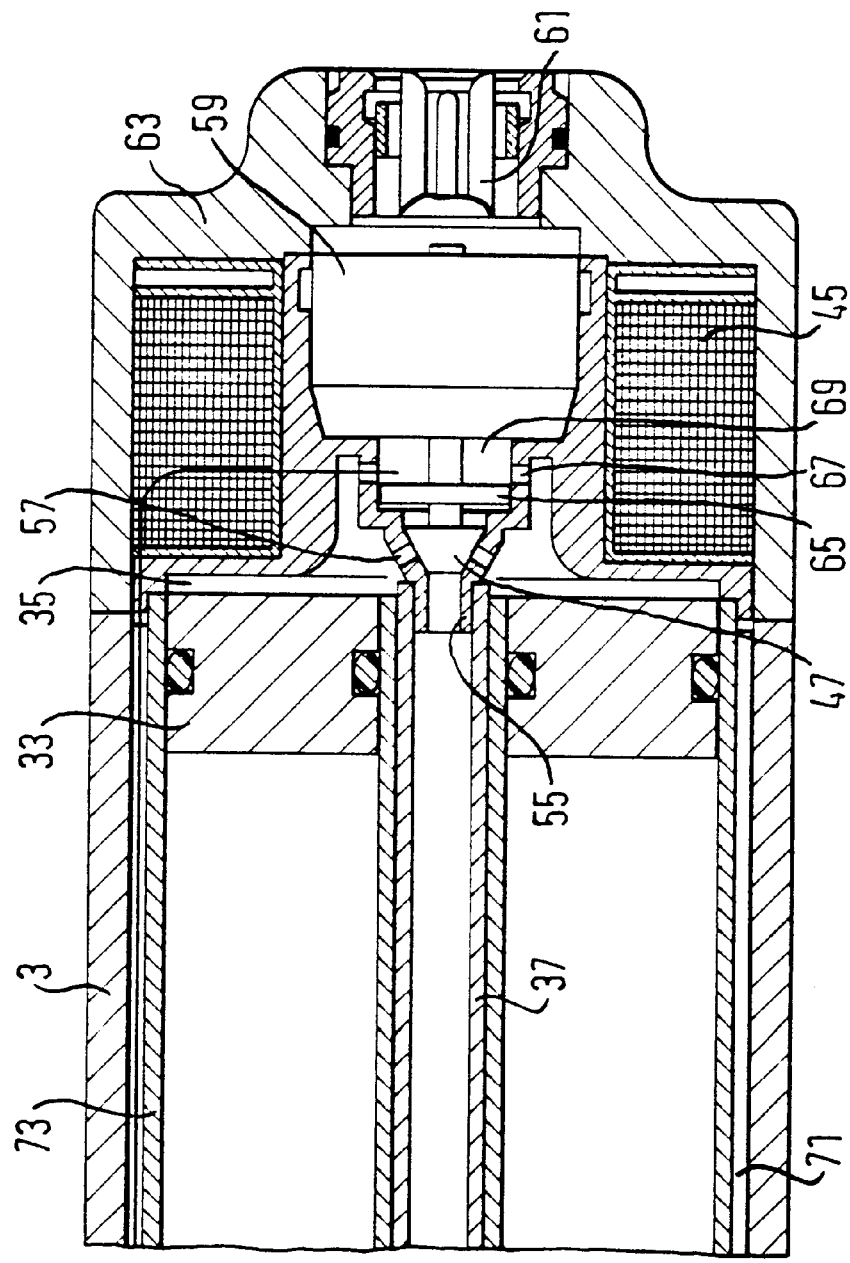

GAS GENERATOR FOR A SAFETY SYSTEM

TECHNICAL FIELD

The invention relates to a gas generator for a safety system, in particular for a vehicle occupant restraint system.

BACKGROUND OF THE INVENTION

A gas generator known from the DE 197 26 276 comprises a combustion chamber which contains propellant, a liquid chamber which contains liquid, a mixing chamber in which a gas developed on burning of the propellant and the liquid mix with each other, and a liquid guide surface onto which the liquid when released is applied substantially tangentially. In conventional gas generators based on solid material, the solid propellant consists hitherto predominantly of sodium azide which, however, is hazardous from a toxic and ecological point of view, for which reason gas generators based on sodium azide are being increasingly replaced by gas generators which are free of sodium azide. The propellant here can consist of various compounds, a higher combustion temperature generally being achieved with these propellants compared with sodium azide, to avoid undesired combustion products. For this reason, the extremely hot gas must, however, be cooled more intensively until entry into the safety system, preferably a gas bag, so that the safety system, in particular the gas bag fabric, is not damaged. For this reason, so-called hybrid gas generators have been considered, which operate partly with a liquid which can also be combustible. The liquid is injected into the hot gas, so that this burns or evaporates and hence increases the volume. With non-burning liquids, the gas temperature is thereby greatly reduced. So that as quickly as possible as much liquid as possible evaporates or burns, this must have as large a surface as possible. The DE 197 26 276 proposes for this to apply the liquid in tangential direction onto a tube which widens in a trumpet shape. Thereby, as thin, uniform a liquid film as possible should spread out on the surface. The gas stream from the combustion chamber strikes onto the surface at an acute angle. This gas stream presses the liquid stream which runs close to and parallel to the surface of the tube widening in a trumpet shape, onto the surface of the tube. On the surface, the liquid is evaporated by the hot gas stream and arrives via outflow openings in the housing at the safety device.

BRIEF SUMMARY OF THE INVENTION

The invention provides a gas generator in which the liquid evaporates or is burned even more quickly, so that the gas generator has a greater efficiency. This is achieved in a gas generator which comprises a combustion chamber which contains propellant, a liquid chamber which contains liquid, and a mixing chamber in which a gas developed on burning of the propellant and the liquid mix with each other. The gas generator further comprises a liquid guide surface onto which the liquid when released is applied substantially tangentially, and a gas directing channel and a surface delimiting the gas directing channel. A flow break-off edge is provided in the mixing chamber, which flow break-off edge is defined on one side by the liquid guide surface and on the other side by the surface delimiting the gas directing channel. The gas directing channel directs a stream of developed gas into the mixing chamber at an angle of between approximately 60° and 120° with respect to the liquid guide surface in a region of the flow break-off edge, so that the liquid loosing from the flow break-off edge is entrained by the gas stream. In the gas generator according to the invention, the streams or flows coming from the various sides of the flow break-off edge meet at the flow break-off edge, namely on the one hand the liquid and on the other hand the hot gas. The hot gas entrains the liquid in the direction of the outflow openings, swirls it and divides it into finest droplets. The liquid is therefore not directed onto a surface onto which the gas jet strikes and on which it evaporates, but rather the liquid is already intensively distributed beforehand by the gas stream, and can also evaporate or burn before striking onto another surface. In this respect, the invention also differs from a gas generator which operates with a so-called baffle plate, onto which a stream of liquid is directed. The liquid is divided into fine droplets by striking onto the baffle plate and not, as in the invention, by the two streams of gas and liquid which are directed differently.

Preferably, the gas stream and the liquid meet each other at an angle of 90°, by the gas stream forming an angle of approximately 90° with respect to the liquid guide surface in the region of the flow break-off edge. As the liquid guide surface, as will be further explained later, can also run in a curved shape, the region is crucial in which the liquid leaves the liquid guide surface, i.e. in the region of or adjacent to the flow break-off edge.

When the gas flow is applied to the gas directing channel, which is preferably the case, and the channel therefore determines the direction of the gas stream in the region of the flow break-off edge, the direction of the gas stream can also be defined directly by the alignment of the gas directing channel. In this case, the inner face of the gas directing channel preferably ends at an angle of approximately 90° to the liquid guide surface in the region of the flow break-off edge.

When all the adjoining surfaces forming the flow break-off edge are curved, the region of the surface close to the flow break-off edge is determinative for the angle which they form with respect to each other. If necessary, tangential planes must be formed in order to determine the angle.

According to the preferred embodiment, the liquid guide surface and the gas directing channel are aligned to each other in such a manner that the stream comprised of gas and entrained liquid is directed into the interior of the mixing chamber. This means that the stream of gas and liquid is not for instance directed directly onto a baffle plate or onto an adjacent wall, as was the gas in the generic prior art. The stream of gas and liquid is to have as long a path as possible through the mixing chamber, before it strikes onto another part. Thereby, also the time available is increased up to striking onto a wall, in which the gas can heat the liquid and can evaporate.

A development also serves the latter purpose, according to which the gas arriving from the combustion chamber into the mixing chamber flows through the mixing chamber in one direction. The liquid guide surface faces away from this direction of flow in the region of the flow break-off edge. This prevents the gas flow from pressing the liquid against the liquid guide surface. Rather, the liquid is to be carried away from the liquid guide surface by the gas stream, for which reason this guide surface also faces away from the direction of flow.

The gas flows through the mixing chamber substantially in axial direction. The liquid guide surface runs in radial direction in the region of the flow break-off edge, so that the two streams of gas and liquid meet each other at the preferred 90° angle. So that the layer of liquid situated on the liquid guide surface, which layer flows to the flow break-off edge, is as thin as possible, the liquid guide surface widens towards the flow break-off edge in a conical shape. Thereby, the thickness of the liquid layer is reduced and makes possible a finer atomization of the liquid. A development serves for this, according to which the liquid guide surface curves outwards in a trumpet shape towards the flow break-off edge. This curved surface can deflect the stream of liquid for example through 90°, and namely from an entry region of the liquid in which, tangentially to the liquid guide surface, the liquid is directed onto the latter, up to the flow break-off edge.

The liquid is injected into the mixing chamber, a working space being provided which adjoins the liquid chamber. Gas is introduced into this working space, to express the liquid.

According to the preferred embodiment, a magnetic valve device is provided, which controls the quantity of gas arriving into the working space. Through the magnetic valve, which has a switching time of only 3 milliseconds, the quantity of liquid, hence the cooling of the gas stream and the entire quantity of gas, can be controlled. Also the chronological progress of the emerging quantity of gas and hence the gas pressure can be varied. Also, a so-called pulsing, i.e. an opening and closing of the valve, is possible. Furthermore, the variability of the gas generator is increased by simple means. For different purposes or different gas bags with various vehicles, also different quantities of gas or different gas pressure profiles are necessary to achieve an optimum restraining effect. Merely through a different controlling by means of different programming of the control unit, which is responsible for actuating the magnetic valve, differing quantities of gas and pressure profiles can be achieved with the same gas generator.

The expressing of the liquid can take place by means of a displaceable piston which separates the liquid chamber from the working space.

Usually, a portion of the generated gas is used for expressing the liquid from the liquid chamber. For this, for example, a pressure equalizing tube can be provided in a tubular gas generator. This axial pressure equalizing tube connects the combustion chamber with the working space with regard to flow. A preferred arrangement of the chambers and spaces with each other makes provision that the combustion chamber and the liquid chamber are arranged at opposite axial ends of the tubular gas generator and the mixing chamber is arranged therebetween. A liquid duct directs liquid in the direction of the combustion chamber. The pressure equalizing tube here can also at least partially delimit the liquid duct. For this, provision is made that the pressure equalizing tube is surrounded by a radially outer delimiting tube and therebetween a liquid duct is formed in the form of an annular channel. A guide system for liquid and gas is thus formed in a simple manner.

The liquid guide surface preferably adjoins the exterior of the pressure equalizing tube in the region of the ends of the pressure equalizing tube and of the delimiting tube on the combustion chamber side. Thereby, it is to be achieved that the flow is applied as tangentially as possible to the liquid guide surface or runs parallel thereto and is directed by it.

A structurally very simple development of the liquid guide surface is achieved by the surface being formed by the side of a delimiting wall, facing the mixing chamber, between combustion chamber and mixing chamber. This delimiting wall can run in a curved shape, viewed in cross-section, and can also narrow on the combustion chamber side up to the opening of the centrally arranged pressure equalizing tube. Thereby, the delimiting wall on the mixing chamber side directs the liquid radially outwards, which liquid preferably flows axially into the mixing chamber. On the combustion chamber side, the narrowing leads to a loss-free guiding of the flow of gas into the pressure equalizing tube.

BRIEF DESCRIPTION OF THE DRAWINGS

FIG. 2 shows an enlarged view of the right-hand end, illustrated in FIG. 1, in the region of the magnetic valve device.

DETAILED DESCRIPTION OF THE PREFERRED EMBODIMENT

Figure 1:
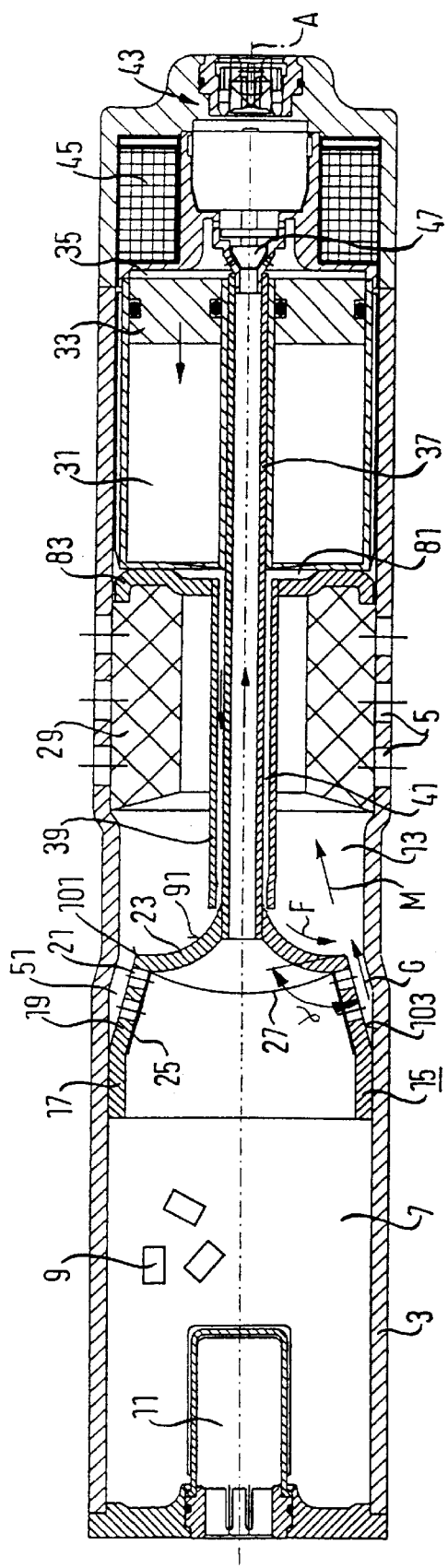
FIG. 1 shows a longitudinal section through an embodiment of the/gas generator according to the invention.

In FIG. 1 a tubular gas generator is illustrated, for inflating a passenger gas bag. The tubular gas generator has a substantially cylindrical outer housing 3 with numerous outflow openings 5 distributed on the circumference. At the left-hand axial end a combustion chamber 7 is provided, which is filled with solid propellant 9. An igniter 11 is intended to serve for igniting the propellant 9. A mixing chamber 13 adjoins the combustion chamber, which mixing chamber 13 is separated from the combustion chamber by a delimiting wall 15 in the form of a sleeve-shaped body pushed into the housing 3 and fastened therein. This sleeve-shaped body has three sections, namely a cylindrical section 17, a cone-shaped section 19 adjoining thereto and narrowing to the right-hand end of the gas generator, which section 19 has through-flow openings 21, and a section 23 bent in a trumpet shape. The through-flow openings 21 are covered on the inner face by a sealing means 25, which also has a cup-shaped region 27 which is spaced away from the section 23.

A cylindrical filter 29 is placed in the mixing chamber in the region of the outflow openings 5. Adjoining the mixing chamber is a liquid chamber 31, which is filled with liquid, which can also include combustible liquid. The right-hand axial end of the liquid chamber 31 is delimited by a displaceable piston 33. The piston 33 separates the liquid chamber 31 from a working space 35.

In the region of the central axis A of the gas generator, a pressure equalizing tube 37 is provided, arranged concentrically thereto, which connects the combustion chamber 7 to the working space 35 with regard to flow. In the region of the mixing chamber, the pressure equalizing tube 37 is surrounded radially and circumferentially by a delimiting tube 39. This delimiting tube 39 has an indentation at its end on the mixing chamber side, so that the liquid duct 41 formed between it and the pressure equalizing tube 37 narrows. In the region of the end of the delimiting tube 39 on the mixing chamber side, the section 23 of the delimiting wall 15, bent in a trumpet shape, begins immediately. This section is curved such that it joins almost continuously on to the exterior of the pressure equalizing tube in the region of its end and, as is explained in further detail below, ensures a gradual deflection of a stream of liquid from the axial direction into the radial direction.

At the opposite end of the pressure equalizing tube 37, its opening to the working space 35 can be opened or closed by a magnetic valve device 43. The magnetic valve device 43 has a coil 45 and a valve needle 47, which can close the opening of the pressure equalizing tube.

For the mode of operation of the gas generator explained hereinbelow, the region upstream of the mixing chamber 13 between housing 3 and the cone-shaped section 19 of the delimiting wall 15 is also important, into which the through-flow openings 21 open. This region is designated as gas directing channel 51.

In FIG. 2, the magnetic valve device and the working space are shown again in further detail. A sleeve 55, widening in a conical shape, is inserted into the end of the pressure equalizing tube 37 on the working space side, which sleeve 55 has through-flow openings 57.

The magnetic valve device 43 consists of an armature housing 59, of the electrical contact arrangement 61 to a control device, of the valve housing 63, the coil 45 and also the valve needle 47. In the state shown in FIG. 2, the through-flow openings 57 are closed. Adjoining the cone-shaped end of the valve needle 47 on the reverse face is an armature disc 65, which with a displacement of the valve needle towards the right can close pressure equalizing bores 67 in an intermediate wall. This intermediate wall separates the working space 35 from a valve chamber 69. The valve device which is shown is a so-called 3/2-way valve. In the plane of the pressure equalizing bores 67, an opening is also provided of a channel, not shown in further detail, but indicated by a continuous line, which channel connects the chamber 69 with a gap 71 between the liquid container 73, which forms the liquid chamber, and the housing 3. The gap 71 leads to the mixing chamber 13. This flow connection between mixing chamber 13 and working space 35 serves for a pressure equalization when the valve is closed. If the valve is opened, the armature disc 65 closes the flow connection, so that no pressure equalization is present between mixing chamber 13 and working space 35. The closed position of the valve, illustrated in FIG. 2, is achieved by the coil 45 being energized. If the coil 45 is not energized, the valve needle 47 can be moved to the right, depending on the pressure in the pressure equalizing tube 37, so that the valve is opened and a pressure equalization can occur between combustion chamber 7 and working space 35. These sequences, however, are explained in further detail hereinbelow.

In the case of an accident, the propellant 9 is ignited by means of the igniter 11. The gas which is produced destroys the sealing means 25 both in the region of the through-flow openings 21 and also in the region 27. A portion of the gas, namely the majority, arrives via the through-flow openings 21 into the gas directing channel 51 and further on into the mixing chamber 13. A smaller portion of the gas arrives via the gas pressure equalizing tube 37 into the working space 35, when the coil 45 is not energized and the gas presses the valve needle 47 to the right. Then the gas flows via the through-flow openings 57 into the working space 35. Thereby, the piston 33 is moved to the left. The liquid container 73 has numerous predetermined breaking lines on its end on the end face, away from the piston 33. In this region, the container 73 breaks open and liquid flows via a collecting chamber 81, which is formed between the container 73 and a wall 83, into the liquid duct 41. The liquid leaves the liquid duct and arrives at the trumpet-shaped section 23 of the dividing wall 15. This section has a curved surface facing the mixing chamber 13, which surface is designated as liquid guide surface 91. The annular stream of liquid lies against this surface because the stream is directed tangentially onto the liquid guide surface 91 in the region of the opening of the liquid duct 41. The film of liquid forming on the surface 91 becomes thinner and thinner, because the surface becomes larger in the direction of flow. The flow, which is represented by an arrow F, is directed radially outwards until the surface ends in an edge 101. This edge 101 is a flow break-off edge for the liquid. In the region of the flow break-off edge, the liquid is entrained by the gas stream G (see arrow G) into the interior of the mixing chamber 13 and is deflected. The two streams F and G form an angle of approximately 90° to each other in the region of the flow break-off edge. As the flow guide surface 91 faces away from the flow G, i.e. lies in its lee, the mixture of gas and of liquid distributed therein is not directed to a close wall but rather into the mixing chamber 13 and namely obliquely radially inwards to between the filter 29 and the delimiting tube 39, so that a very long flow path results for the mixed gas which is marked by the arrow M. In this way, the liquid is evaporated and the gas is cooled. The mixture of evaporated liquid and cooled gas leaves the gas generator through the filter 29 and the outflow openings 5.

The formation of the surfaces defining the flows in the region of the flow break-off edge 101 is crucial for the optimum mixing of liquid and hot gas. The gas directing channel 51 is defined on the interior by the outer surface 103 of the section 19. This surface meets the liquid guide surface 91 at an angle α of 90° in the region of the flow break-off edge 101, so that the flow break-off edge 101 is a 90° edge. The gas stream G, as explained, immediately entrains the liquid, so that the latter can not strike onto the housing 3 radially outwards. Through this entraining and breaking up of the liquid film, which leaves the liquid guide surface 91 at the flow break-off edge 101, the liquid is distributed extremely finely and can thereby quickly absorb the energy of the gas.

Depending on the construction of the gas generator, other angles of the flows F and G are also conceivable, namely angles in the range between 60 and approximately 120°. However, it is important here that this angle is coordinated to the geometry of the walls so that the liquid is entrained by the gas stream and is distributed extremely finely and has such a long path in the mixing chamber that it does not strike onto the next wall in liquid state, but in evaporated state.

What is claimed is:

1. An inflator for a vehicle occupant restraint apparatus, said inflator comprising:

a housing;

a combustion chamber containing ignitable propellant which produces gas upon ignition;

a liquid chamber containing liquid;

a mixing chamber for mixing said gas and said liquid;

a wall separating said mixing chamber and said combustion chamber;

said wall and said housing defining a gas directing channel for directing said gas, and said wall further including a liquid guide surface for guiding said liquid;

an intersection of said liquid guide surface and said gas directing channel defining a flow break-off edge;

said wall further including gas guiding ports for guiding said gas before said gas reaches said gas directing channel, said gas flowing through said gas guiding ports in a direction radially outwardly and subsequently in a direction generally axially to said break off edge, said liquid guide surface being curved and extending radially outward to said break-off edge, said liquid guide surface and said gas directing channel at said flow break-off edge being at an angle of between 60° and 120° to each other;

said liquid being divided into fine droplets by said gas at said flow break-off edge.

2. The gas generator according to claim 1, wherein said gas stream forms an angle of approximately 90° to said liquid guide surface in said region of said flow break-off edge.

3. The gas generator according to claim 2, wherein an inner face of said gas directing channel ends at said flow break-off edge at an angle of approximately 90° to said liquid guide surface in said region of said flow break-off edge.

4. The gas generator according to claim 1, wherein said liquid guide surface and said gas directing channel are aligned to each other in such a manner that a stream comprised of gas and entrained liquid is directed into the interior of said mixing chamber.

5. The gas generator according to claim 1, wherein said liquid guide surface in said region of said flow break-off edge faces substantially in the same direction as said gas stream which is directed from said combustion chamber into said mixing chamber via said gas directing channel.

6. The gas generator according to claim 1, wherein said curved liquid guide surface is a trumpet shape.

7. The gas generator according to claim 1, wherein a working space is provided which adjoins said liquid chamber and into which gas is introduced for expressing said liquid.

8. The gas generator according to claim 1, wherein said gas directing channel is arranged downstream of said combustion chamber and said gas stream arrives into said gas directing channel from said combustion chamber.

9. The gas generator according to claim 7, wherein a portion of said gas generated by combustion of said propellant is used for expressing said liquid from said liquid chamber.

10. A gas generator for a vehicle occupant restraint system, comprising:
   a combustion chamber which contains propellant;
   a liquid chamber which contains liquid;
   a mixing chamber in which a gas developed on burning of said propellant and said liquid mix with each other,
   a liquid guide surface,
   said liquid, when released, being applied substantially tangentially to said liquid guide surface, and
   a gas directing channel and a surface delimiting said gas directing channel,
   a flow break-off edge being provided in said mixing chamber, which flow break-off edge is defined on one side by said liquid guide surface and on the other side by said surface delimiting said gas directing channel,
   said gas directing channel directing a stream of developed gas into said mixing chamber at an angle of between approximately 60° and 120° with respect to said liquid guide surface in a region of said flow break-off edge, so that said liquid guided on said liquid guide surface and off of said break-off edge is entrained by said gas stream, and
   a working space is provided adjoining said liquid chamber and into which gas is introduced for expressing said liquid,
   a magnetic valve is provided which controls a quantity of said gas arriving into said working space.

11. A gas generator for a vehicle occupant restraint system, comprising:
   a combustion chamber which contains propellant;
   a liquid chamber which contains liquid;
   a mixing chamber in which a gas developed on burning of said propellant and said liquid mix with each other,
   a liquid guide surface,
   said liquid, when released, being applied substantially tangentially to said liquid guide surface, and
   a gas directing channel and a surface delimiting said gas directing channel,
   a flow break-off edge being provided in said mixing chamber, which flow break-off edge is defined on one side by said liquid guide surface and on the other side by said surface delimiting said gas directing channel,
   said gas directing channel directing a stream of developed gas into said mixing chamber at an angle of between approximately 60° and 120° with respect to said liquid guide surface in a region of said flow break-off edge, so that said liquid guided on said liquid guide surface and off of said break-off edge is entrained by said gas stream,
   a working space is provided adjoining said liquid chamber and into which gas is introduced for expressing said liquid,
   wherein a portion of said gas generated by combustion of said propellant is used for expressing said liquid from said liquid chamber,
   said gas generator being a tubular gas generator, and
   an axial pressure equalizing tube is provided which flowingly connects said combustion chamber and said working space with each other, said working space adjoining said liquid chamber.

12. The gas generator according to claim 11, wherein aid combustion chamber and said liquid chamber are arranged at opposite axial ends of said tubular gas generator and said mixing chamber is arranged between said axial ends and wherein a liquid duct directing said liquid towards said combustion chamber is provided.

13. The gas generator according to claim 12, wherein said pressure equalizing tube at least partially also delimits said liquid duct.

14. The gas generator according to claim 13, wherein said pressure equalizing tube is surrounded by a radially outer delimiting tube and said liquid duct is formed therebetween.

15. The gas generator according to claim 14, wherein said pressure equalizing tube and said delimiting tube each have a combustion chamber side end and wherein in a region of said ends of said pressure equalizing tube and of said delimiting tube said liquid guide surface begins, starting from an outer face of said pressure equalizing tube.

16. The gas generator according to claim 15, wherein said liquid guide surface runs from said outer face of said pressure equalizing tube to said flow break-off edge in a curved shape.

17. The gas generator according to claim 11, wherein a delimiting wall is provided between said mixing chamber and said combustion chamber, said liquid guide surface being formed by a side of said delimiting wall facing said mixing chamber, and wherein said delimiting wall runs in a curved shape, viewed in a longitudinal section, its side facing said combustion chamber narrowing up to an opening of said pressure equalizing tube.

18. An inflator for a vehicle occupant restraint apparatus, said inflator comprising:
   a housing;
   a combustion chamber containing ignitable propellant which produces gas upon ignition;
   a liquid chamber containing liquid;

a mixing chamber for mixing said gas and said liquid;

a wall separating said mixing chamber and said combustion chamber;

said wall and said housing defining a gas directing channel for directing said gas, and said wall further including a liquid guide surface for guiding said liquid;

an intersection of said liquid guide surface and said gas directing channel defining a flow break-off edge;

said liquid guide surface being curved and extending radially outward to said break-off edge, said liquid guide surface and said gas directing channel at said flow break-off edge being at an angle of between 60° and 120° to each other;

said liquid being divided into fine droplets by said gas at said flow break-off edge, said liquid surface in said region of said flow break-off edge facing substantially in the same direction as said gas stream which is directed from said combustion chamber into said mixing chamber via said gas directing channel, said gas stream arriving in said mixing chamber via said gas directing channel substantially in axial direction and said liquid guide surface running in radial direction in said region of said flow break-off edge.

* * * * *